Oct. 21, 1958 E. C. ELSNER 2,856,663
PIN LOOP FASTENER
Filed March 19, 1958
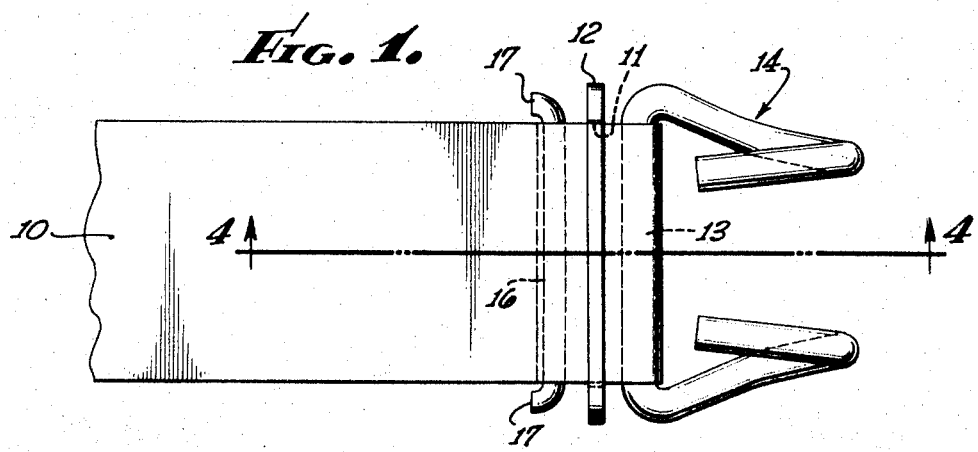
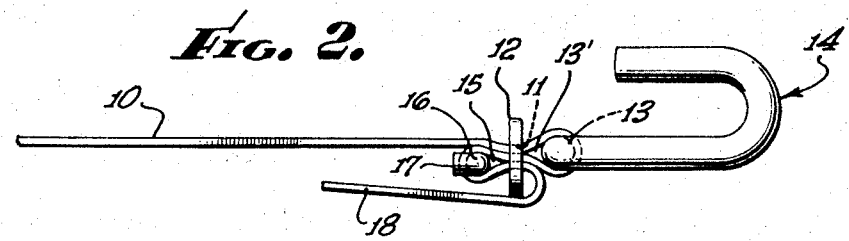
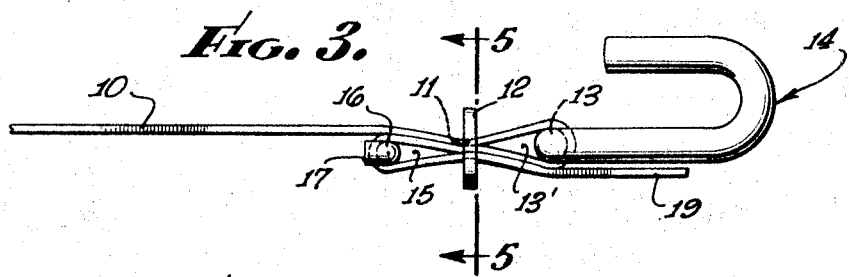
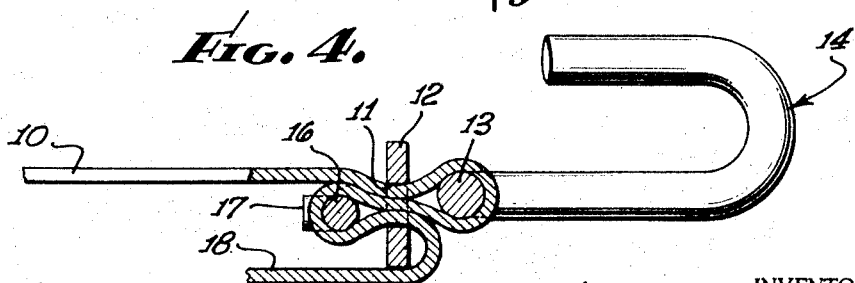
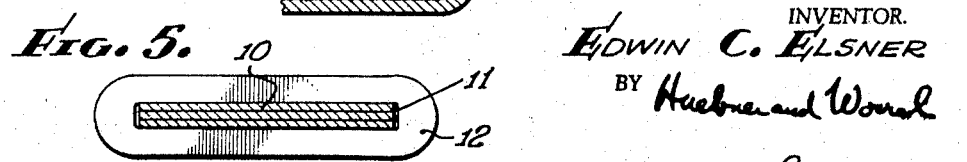
INVENTOR.
EDWIN C. ELSNER
BY Huebner and Worrel
ATTORNEYS.

United States Patent Office

2,856,663
Patented Oct. 21, 1958

2,856,663

PIN LOOP FASTENER

Edwin C. Elsner, Glendale, Calif., assignor to Aeroquip Corporation, Jackson, Mich., a corporation of Michigan Application March 19, 1958, Serial No. 722,415

13 Claims. (Cl. 24—182)

This invention relates to a fastening mechanism employed to bind a strap or length of webbing to a hook, buckle, clevis or other coupling device.

Straps, webbing and other strap-type flexible elements are widely used in cargo tie-down mechanisms, and, particularly as a result of increased air cargo transportation, their use for such purposes has rapidly multiplied. In such uses it is generally required that the strap-type flexible element be securely fastened at one end to a hook, buckle or other coupling device, and the accepted method has been to permanently fasten the end of the strap to the hook or other mechanism by rivets, or in the case of webbing, by stitching. Such permanent fastening has had its disadvantages, generally because it is required to be done at the manufacturing plant which is supplying the hook and the strap or webbing, rather than at the place of cargo loading, thereby restricting the strap or webbing to predetermined lengths, which has naturally tended to standardization, whereas, in many instances, variable or adjustable lengths are highly desirable.

An object of the present invention is to provide a device which will permit the ready adjustment of the length of the strap or webbing in the field to meet varying cargo tie-down requirements.

A further object of the invention is to provide a fastening device which is simple in design, easy and inexpensive to manufacture, and positive in performance, but at the same time readily adaptable for release and reuse.

Another object of the invention is to provide a fastening device with a minimal number of parts which can be quickly mounted on a strap or webbing, but which will tenaciously hold the strap or webbing against slippage under load tension.

A further object of the invention is to provide a fastening device which may be mounted on the strap or webbing at any position along the entire length of the strap or webbing, rather than solely at the end thereof.

The invention also comprises novel details of construction and novel combinations and arrangements of parts which will be apparent from the following description and drawings which, however, merely describe preferred embodiments of the present invention, and which are given for purposes of illustration and example only.

In the drawings:

Figure 1 is a plan view of the fastening device in operative position on a length of webbing.

Figure 2 is a side elevation of the fastening device in operative position.

Figure 3 is a side elevation generally similar to Figure 2, but with the fastening device in partially released position and with the free end of the webbing in extended position.

Figure 4 is a cross section taken on the line 4—4 of Figure 1.

Figure 5 is a front elevation of one element of the fastening device, a confining device with a sectional view of the webbing on which it is mounted.

The free end of a strap or length of webbing 10 is threaded through a slotted opening 11 in an elongate plate or confining device 12. The slot 11 is only slightly longer than the width of the strap or webbing 10 which is threaded into it, and is only slightly wider than three times the thickness of said strap or webbing, thereby permitting the strap or webbing to be slidably accommodated therein.

The free end of the strap or webbing is then passed around a cross member 13 of a hook or coupling device 14, to which the strap or webbing is to be secured, and forms a bight 13'. A hook is the form of coupling device illustrated in the drawings, but it will be recognized that it is merely illustrative of a coupling device or mechanism to which the strap or webbing is to be fastened, and which may be referred to generally as a coupling device or element.

The free end of the strap or webbing is then doubled back and threaded through the slotted opening 11 of the confining device 12 in the opposite direction from the first threading, and a free loop is formed therein as at 15.

A pin or bar 16 is then inserted in the loop 15. This pin or bar is preferably cylindrical, and it is also preferably somewhat longer than the width of the strap or webbing. The ends 17 of the pin or bar 16 may be bent so as to impinge on the sides of the strap or webbing 10, and prevent the bar 16 from slipping out of the loop 15 when the fastener is tightened as hereinafter described. Obviously other forms of end stops may be employed.

The diameter or cross-section of the pin or bar 16 must be large enough so that when the bar 16 is mounted in position in the loop 15, its diameter plus three thicknesses of the strap or webbing 10 will be greater than the width of the slotted opening 11, so that, when tension is applied to the strap or webbing 10, the three thicknesses of the strap or webbing and the bar cannot be pulled through the slotted opening 11.

The loop 15 is formed as a bight around the bar 16, and the free end of the strap or webbing is again threaded through the slotted opening 11 in the same direction as the first threading described herein. When tension is applied to the strap or webbing by pulling on the coupling device while the opposite end of the strap or webbing is restrained, the two bights in the strap or webbing are tightly closed, the confining device 12 is brought into close proximity to the cross member 13, and the pin or bar 16 is in turn brought into close proximity to the plate 12, and the strap or webbing is wedged against the edges of the slotted opening so that slippage is eliminated and a tight fastening is accomplished.

The free end of the strap or webbing may be either bent back over the outside edge of the plate or confining device 12, and arranged parallel to the main body of the strap or webbing 10, as at 18 in Figures 2 and 4, or left in extended position, as at 19 in Figure 3, as desired.

When tension is released and the loops are loosened to free the bights, the strap or webbing may be slipped relative to the cross member 13, the confining device 12, and the pin or bar 16, permitting free release or adjustment of the coupling device 14, at any desired position along the length of the strap or webbing 10.

While the instant invention has been shown and described herein in what is conceived to be the most practical and preferred embodiments thereof, it will be recognized that departures may be made therefrom within the scope of the invention, which is therefore not to be limited to the details disclosed herein, but is to be accorded the full scope of the claims so as to embrace any and all equivalent devices.

Having thus described the invention, what I claim as new and desire to secure by Letters Patent is:

1. In combination: a coupling device including a cross member, a strap-type flexible element adapted for connection to said coupling device at any selected portion of its length, and means cooperating with said element and said cross member to detachably connect said element to said cross member and comprising a bar generally parallel to and spaced from said cross member, an element confining device having an opening therein of sufficient width to slidably accommodate three thicknesses of said element, said confining device being positioned between said cross member and said bar, said element being positioned with a first pass through said opening and a loop around said cross member, a second pass through said opening in a counter direction to the first and a loop around said bar, and a third pass through said opening in a counter direction to the second, whereby so long as the loops are drawn tight to form bights over the cross member and bar respectively, the bar coacts with said confining device and said element to wedge the latter against the edges of the opening in said confining device and prevent slippage of said element, and when the loops are loosened to free the bights, the element may be slipped relative to the cross member, confining device and bar.

2. In combination: a coupling device including an elongated, generally cylindrical cross member, a strap-type flexible element adapted for connection to said coupling device at any selected portion of its length, and means cooperating with said element and said cross member to detachably connect said element to said cross member and comprising a bar generally parallel to and spaced from said cross member, an element confining device having an opening therein of sufficient width to slidably accommodate three thicknesses of said element, said confining device being positioned between said cross member and said bar, said element being positioned with a first pass through said opening and a loop around said cross member, a second pass through said opening in a counter direction to the first and a loop around said bar, and a third pass through said opening in a counter direction to the second, whereby so long as the loops are drawn tight to form bights over the cross member and bar respectively, the bar coacts with said confining device and said element to wedge the latter against the edges of the opening in said confining device and prevent slippage of said element, and when the loops are loosened to free the bights, the element may be slipped relative to the cross member, confining device and bar.

3. In combination: a coupling device including a cross member, a strap-type flexible element adapted for connection to said coupling device at any selected portion of its length, and means cooperating with said element and said cross member to detachably connect said element to said cross member and comprising a bar generally parallel to and spaced from said cross member, a member having an elongated slot therein, said member being positioned between said cross member and said bar, said element being positioned with a first pass through said slot and a loop around said cross member, a second pass through said slot in a counter direction to the first and a loop around said bar, and a third pass through said slot in a counter direction to the second, whereby so long as the loops are drawn tight to form bights over the cross member and bar respectively, the bar coacts with said member and said element to wedge the latter against the edges of the slot in said member and prevent slippage of said element, and when the loops are loosened to free the bights, the element may be slipped relative to the cross member, said member and bar.

4. In combination: a coupling device including a cross member, a strap-type flexible element adapted for connection to said coupling device at any selected portion of its length, and means cooperating with said element and said cross member to detachably connect said element to said cross member and comprising a bar generally parallel to and spaced from said cross member, a plate having a slot therein, said plate being positioned between said cross member and said bar, said element being positioned with a first pass through said slot and a loop around said cross member, a second pass through said slot in a counter direction to the first and a loop around said bar, and a third pass through said slot in a counter direction to the second, whereby so long as the loops are drawn tight to form bights over the cross member and bar respectively, the bar coacts with said plate and said element to wedge the latter against the edges of the slot in said plate and prevent slippage of said element, and when the loops are loosened to free the bights, the element may be slipped relative to the cross member, plate and bar.

5. In combination: a coupling device including a cross member, a strap-type flexible element adapted for connection to said coupling device at any selected portion of its length, and means cooperating with said element and said cross member to detachably connect said element to said cross member and comprising a bar generally parallel to and spaced from said cross member, a plate having a slot therein, said slot being of sufficient width to slidably accommodate three thicknesses of said element, said plate being positioned between said cross member and said bar, said element being positioned with a first pass through said slot and a loop around said cross member, a second pass through said slot in a counter direction to the first and a loop around said bar, and a third pass through said slot in a counter direction to the second, whereby so long as the loops are drawn tight to form bights over the cross member and bar respectively, the bar coacts with said plate and said element to wedge the latter against the edges of the slot in said plate and prevent slippage of said element, and when the loops are loosened to free the bights, the element may be slipped relative to the cross member, plate and bar.

6. In combination: a coupling device including a cross member, a strap-type flexible element adapted for connection to said coupling device at any selected portion of its length, and means cooperating with said element and said cross member to detachably connect said element to said cross member and comprising a bar generally parallel to and spaced from said cross member, said bar having a diameter sufficient to prevent the bar being pulled through an opening in a confining device when three thicknesses of said element occupy said opening, an element confining device having an opening therein of sufficient width to slidably accommodate three thicknesses of said element, said confining device being positioned between said cross member and said bar, said element being positioned with a first pass through said opening and a loop around said cross member, a second pass through said opening in a counter direction to the first and a loop around said bar, and a third pass through said opening in a counter direction to the second, whereby so long as the loops are drawn tight to form bights over the cross member and bar respectively, the bar coacts with said confining device and said element to wedge the latter against the edges of the opening in said confining device and prevent slippage of said element, and when the loops are loosened to free the bights, the element may be slipped relative to the cross member, confining device and bar.

7. In combination: a coupling device including a cross member, a strap-type flexible element adapted for connection to said coupling device at any selected portion of its length, and means cooperating with said element and said cross member to detachably connect said element to said cross member and comprising a bar generally parallel to and spaced from said cross member, said bar being in the form of a cylindrical pin and being provided with transverse projections on the ends thereof adapted to engage the edges of said element, an element confining device having an opening therein of sufficient width to slidably accommodate three thicknesses of said element, said confining device being positioned between said cross member and said bar, said element being positioned with a first pass through said opening and a loop around said cross member, a second pass through said opening in a counter direction to the first and a loop around said bar, and a third pass through said opening in a counter direction to the second, whereby so long as the loops are drawn tight to form bights over the cross member and bar respectively, the bar coacts with said confining device and said element to wedge the latter against the edges of the opening in said confining device and prevent slippage of said element, and when the loops are loosened to free the bights, the element may be slipped relative to the cross member, confining device and bar.

8. In combination: a coupling device including an elongated, generally cylindrical cross member, a strap-type flexible element adapted for connection to said coupling device at any selected portion of its length, and means cooperating with said element and said cross member to detachably connect said element to said cross member and comprising a bar generally parallel to and spaced from said cross member, a member having an elongated slot therein, said member being positioned between said cross member and said bar, said element being positioned with a first pass through said slot and a loop around said cross member, a second pass through said slot in a counter direction to the first and a loop around said bar, and a third pass through said slot in a counter direction to the second, whereby so long as the loops are drawn tight to form bights over the cross member and bar respectively, the bar coacts with said member and said element to wedge the latter against the edges of the slot in said member and prevent slippage of said element, and when the loops are loosened to free the bights, the element may be slipped relative to the cross member, said member and bar.

9. In combination: a coupling device including an elongated, generally cylindrical cross member, a strap-type flexible element adapted for connection to said coupling device at any selected portion of its length, and means cooperating with said element and said cross member to detachably connect said element to said cross member and comprising a bar generally parallel to and spaced from said cross member, a plate having an elongated slot therein, said slot being of sufficient width to slidably accommodate three thicknesses of said element, said plate being positioned between said cross member and said bar, said element being positioned with a first pass through said slot and a loop around said cross member, a second pass through said slot in a counter direction to the first and a loop around said bar, and a third pass through said slot in a counter direction to the second, whereby so long as the loops are drawn tight to form bights over the cross member and bar respectively, the bar coacts with said plate and said element to wedge the latter against the edges of the slot in said plate and prevent slippage of said element, and when the loops are loosened to free the bights, the element may be slipped relative to the cross member, plate and bar.

10. In combination: a coupling device including a cross member, a strap-type flexible element adapted for connection to said coupling device at any selected portion of its length, and means for cooperating with said element and said cross member to detachably connect said element to said cross member and comprising a bar generally parallel to and spaced from said cross member, said bar having a cross-section sufficient to prevent the bar being pulled through an elongated slot in a plate when three thicknesses of said element occupy said slot, a plate having a slot therein, said slot being of sufficient width to slidably accommodate three thicknesses of said element, said plate being positioned between said cross member and said bar, said element being positioned with a first pass through said slot and a loop around said cross member, a second pass through said slot in a counter direction to the first and a loop around said bar, and a third pass through said slot in a counter direction to the second, whereby so long as the loops are drawn tight to form bights over the cross member and bar respectively, the bar coacts with said plate and said element to wedge the latter against the edges of the slot in said plate and prevent slippage of said element, and when the loops are loosened to free the bights, the element may be slipped relative to the cross member, plate and bar.

11. Fastening means for attaching a strap or webbing to a hook, buckle or other securing device embodying a cross member, comprising an elongated piece formed with a slot therein, and a bar, and a strap or webbing positioned with three continuous and alternating passes thereof disposed in said slot and looped to form a bight on one side of the piece and around the cross member and looped to form a bight on the other side of the piece and around the bar.

12. Fastening means comprising a hook, buckle or other coupling device embodying a cross member, an elongated slotted piece, and a bar, all adapted to be assembled with a strap or webbing, said elongated slotted piece being positioned between said cross member and said bar, said strap or webbing being positioned with a first pass through the slotted piece and a loop around said cross member, a second pass through the slotted piece in a counter direction to the first pass and a loop around said bar, and a third pass through the slotted piece in a counter direction to the second pass whereby, so long as the loops are drawn tight to form bights over the cross member and bar respectively, the cross member, slotted piece and bar are drawn into close proximity to each other and said strap or webbing is wedged against the slotted piece.

13. Fastening means comprising a hook, buckle or other coupling device embodying a cross member, an elongated slotted piece, and a bar, all adapted to be assembled with a strap or webbing, said elongated slotted piece being positioned between said cross member and said bar, said strap or webbing being positioned with a first pass through the slotted piece and a loop around said cross member, a second pass through the slotted piece in a counter direction to the first pass and a loop around said bar, and a third pass through the slotted piece in a counter direction to the second pass whereby, so long as the loops are drawn tight to form bights over the cross member and bar respectively, the cross member, slotted piece and bar are drawn into close proximity to each other and said strap or webbing is wedged against the slotted piece, and when the loops are loosened, the bights are freed and the strap or webbing is no longer wedged against the slotted piece and may be freely slipped relative to the cross member, slotted piece and bar.

No references cited.